United States Patent
Nekl

(10) Patent No.: US 7,893,748 B1
(45) Date of Patent: Feb. 22, 2011

(54) GLITCH-FREE CLOCK MULTIPLEXER THAT PROVIDES AN OUTPUT CLOCK SIGNAL BASED ON EDGE DETECTION

(75) Inventor: Joshua J. Nekl, Kuna, ID (US)

(73) Assignee: IXYS CH GmbH (CH)

( * ) Notice: Subject to any disclaimer, the term of this patent is extended or adjusted under 35 U.S.C. 154(b) by 32 days.

(21) Appl. No.: 12/386,590

(22) Filed: Apr. 21, 2009

Related U.S. Application Data

(63) Continuation of application No. 11/796,644, filed on Apr. 27, 2007, now Pat. No. 7,629,828.

(51) Int. Cl.
*H03K 3/00* (2006.01)
(52) U.S. Cl. .......................................... 327/298; 327/99
(58) Field of Classification Search ................... 327/99, 327/407, 408, 291, 298
See application file for complete search history.

(56) References Cited

U.S. PATENT DOCUMENTS

| | | | | |
|---|---|---|---|---|
| 4,398,155 A | * | 8/1983 | Atwell et al. | 327/144 |
| 4,855,615 A | * | 8/1989 | Humpleman | 327/144 |
| 5,319,678 A | | 6/1994 | Ho et al. | 375/354 |
| 5,502,409 A | | 3/1996 | Schnizlein et al. | 327/99 |
| 5,539,337 A | | 7/1996 | Taylor et al. | 326/94 |
| 5,561,792 A | * | 10/1996 | Ganapathy | 713/501 |
| 5,731,715 A | | 3/1998 | Mote, Jr. | 326/93 |
| 5,834,968 A | * | 11/1998 | Imamiya | 327/552 |
| 6,025,744 A | * | 2/2000 | Bertolet et al. | 327/276 |
| 6,075,392 A | | 6/2000 | Sandner | 327/145 |

(Continued)

FOREIGN PATENT DOCUMENTS

JP   59221115 A   * 12/1984

(Continued)

OTHER PUBLICATIONS

IBM Technical Disclosure, Gartmann et al., "Method To Select One Of Two Clocks While Avoiding Narrow Pulses," vol. 32 No. 9B, Feb. 1990, pp. 82-84, printout from Delphion.

(Continued)

*Primary Examiner*—Lincoln Donovan
*Assistant Examiner*—Adam D Houston
(74) *Attorney, Agent, or Firm*—Imperium Patent Works; Glen B. Choi; Darien K. Wallace

(57) ABSTRACT

Clock multiplexing techniques generate an output clock signal by detecting edges of a selected input clock signal and toggling the output clock signal based on detected edges of the selected input clock signal. Toggle signals are generated based on detected edges of the selected input clock signal. Toggle signals are used to control when the output clock signal is to toggle high or low. A latch holds the state of the output clock signal in its current state until changed by receipt of a toggle signal. Switching from use of a first clock signal to use of a second clock signal occurs regardless of whether the first input clock is operating. A delay is introduced that prevents glitches in the output clock signal that are less than one half clock period of the next selected input clock signal in duration.

20 Claims, 4 Drawing Sheets

U.S. PATENT DOCUMENTS

| | | | | |
|---|---|---|---|---|
| 6,107,841 | A * | 8/2000 | Goodnow | 327/99 |
| 6,266,780 | B1 | 7/2001 | Grundvig et al. | 713/501 |
| 6,292,044 | B1 | 9/2001 | Mo et al. | 327/298 |
| 6,324,652 | B1 | 11/2001 | Henderson et al. | 713/500 |
| 6,452,426 | B1 * | 9/2002 | Tamarapalli et al. | 327/99 |
| 6,501,304 | B1 | 12/2002 | Boerstler et al. | 327/99 |
| 6,507,221 | B2 * | 1/2003 | La Rosa | 327/34 |
| 6,563,349 | B2 * | 5/2003 | Menezes et al. | 327/99 |
| 6,593,780 | B2 * | 7/2003 | Lammers | 327/99 |
| 6,600,345 | B1 * | 7/2003 | Boutaud | 327/99 |
| 6,653,867 | B1 * | 11/2003 | Shihadeh | 326/96 |
| 6,784,699 | B2 * | 8/2004 | Haroun et al. | 327/99 |
| 6,975,145 | B1 * | 12/2005 | Vadi et al. | 327/99 |
| 7,039,146 | B2 | 5/2006 | Chiu | 375/373 |
| 7,180,336 | B2 * | 2/2007 | Lee et al. | 327/99 |
| 7,183,831 | B2 | 2/2007 | Ikeda | 327/298 |
| 7,272,069 | B2 * | 9/2007 | Su | 365/233.1 |
| 7,296,170 | B1 * | 11/2007 | Richmond et al. | 713/324 |
| 7,334,152 | B2 * | 2/2008 | Morigaki | 713/503 |
| 7,375,571 | B1 * | 5/2008 | Tiffany | 327/298 |
| 7,411,427 | B1 * | 8/2008 | Fong | 327/34 |
| 2003/0030475 | A1 * | 2/2003 | Ishikawa | 327/291 |
| 2003/0085748 | A1 * | 5/2003 | Ryu | 327/291 |
| 2003/0184347 | A1 * | 10/2003 | Haroun et al. | 327/99 |
| 2005/0270073 | A1 * | 12/2005 | Lee et al. | 327/99 |
| 2005/0285636 | A1 * | 12/2005 | Ikeda | 327/99 |
| 2006/0091928 | A1 * | 5/2006 | Kapur | 327/298 |
| 2007/0096774 | A1 * | 5/2007 | Yang et al. | 327/99 |
| 2007/0152719 | A1 * | 7/2007 | Wu et al. | 327/99 |
| 2008/0054952 | A1 * | 3/2008 | Nozaki | 327/99 |
| 2008/0164930 | A1 * | 7/2008 | Rausch | 327/298 |

FOREIGN PATENT DOCUMENTS

| | | |
|---|---|---|
| WO | WO 03/044996 A2 | 11/2001 |

OTHER PUBLICATIONS

EETimes.com, Rafey Mahmud, "Techniques to Make Clock Switchin Glitch Free," Jun. 26, 2003, 8 pages.

Chip Design Magazine, Roy Parker, "Caution: Clock Crossing: A Prescription for Uncontaminated Data Across Clock Domains," Jul. 2004, 12 pages, printout from www.chipdesignmag.com.

* cited by examiner

US 7,893,748 B1

GLITCH-FREE CLOCK MULTIPLEXER THAT PROVIDES AN OUTPUT CLOCK SIGNAL BASED ON EDGE DETECTION

CROSS REFERENCE TO RELATED APPLICATION

This application is a continuation of, and claims priority under 35 U.S.C. §120 from, nonprovisional U.S. patent application Ser. No. 11/796,644 entitled "Glitch-Free Clock Multiplexer That Provides An Output Clock Signal Based On Edge Detection" filed on Apr. 27, 2007 now U.S. Pat. No. 7,629,828, the subject matter of which is incorporated herein by reference.

CROSS REFERENCE TO COMPACT DISC APPENDIX

The Compact Disc, which is a part of the present disclosure, includes a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND INFORMATION

Many semiconductor devices have multiple clock signal sources available for use. If clock signals from two clock signal sources are not in phase, then switching directly from one clock source to another clock source will likely cause a short runt pulse with a clock period less than a minimum clock period. The short runt pulse could cause incorrect operation of the semiconductor device. One technique for avoiding glitches is to turn off the current clock source, then allow a couple of cycles of the clock signal from the next clock source to occur before selecting use of the next clock source.

Another technique for avoiding glitches uses a synchronizer circuit. For example, U.S. Pat. No. 6,324,652 describes use of a synchronizer circuit to avoid glitches. One issue with such synchronizer circuits is that they may require clock signals from both the current and next clock source to be running in order to switch from use of the current clock source to use of the next clock source. If the current clock signal fails prior to switching to the next clock signal, switching to the next clock signal may not take place.

SUMMARY

Clock multiplexing techniques generate an output clock signal by detecting edges of an input clock signal and toggling the output clock signal based on detected edges of the input clock signal. Switching to use of the second clock signal as the input clock signal to generate an output clock signal occurs regardless of whether the first input clock is operating. Rather than enabling use of the second clock signal as the input clock signal by using the first clock signal, toggle signals are generated based on detected rising and falling edges of the selected input clock signal. Toggle signals are used to control when the output clock signal is to toggle high or low. If the first clock signal fails or is unavailable when the first clock signal is selected as the input clock signal, then the state of the output clock signal remains unchanged. When the second clock signal is selected as the input clock signal, toggle signals based on detected edges of the second clock signal cause the output clock signal to track the second clock signal.

A delay is introduced between selection of the second clock signal as the input clock signal and generating toggle signals using the second clock signal. In one example, the delay is at least one half clock cycle of the second clock signal. The delay prevents glitches that are less than one half clock cycle of the second clock signal in duration.

In one embodiment, flip-flops are used to receive a clock select signal and delay output of the clock select signal. Other flip-flops receive the delayed clock select signal in the form of a clock enable signal. The clock enable signal permits the other flip-flops to generate toggle signals based on the second clock signal. A latch provides the output clock signal at its output. The toggle signals are received by the latch. The latch stores the state of the clock signal at its output and changes the state of the output clock signal in response to receiving a toggle signal. In a scenario where no toggle signal is received such as where the current input clock signal is unavailable, the state of the output clock signal does not change. The state of the output clock signal would change after an input clock signal that is available is selected and a toggle signal based on such input clock signal is provided.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
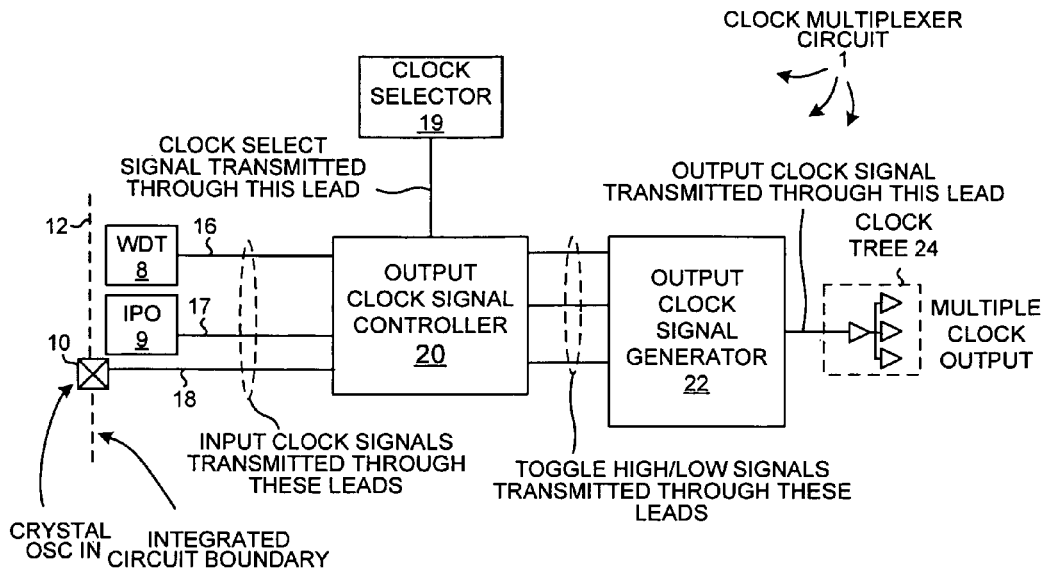
FIG. 1 is a simplified block diagram of a clock multiplexer circuit in accordance with one novel aspect.

FIG. 1 is a simplified block diagram of a clock multiplexer circuit 1 in accordance with one novel aspect. Clock multiplexer circuit 1 includes clock selector 19, output clock signal controller 20, output clock signal generator 22, and clock tree 24. Clock multiplexer circuit 1 is embodied as an integrated circuit along with a processor (not shown), a power on reset circuit (not shown), a watchdog timer clock source (WDT) 8 (which in this example generates a 100 kHz clock signal), an internal precision oscillator (IPO) 9 (which in this example generates a 5.526 MHz clock signal), and a terminal 10 for receiving a clock signal from an external crystal oscillator. Vertical dashed line 12 represents a boundary of the integrated circuit. WDT 8, IPO 9, and terminal 10 provide clock signals using respective leads 16, 17, and 18 to output clock signal controller 20. Clock selector 19 selects which clock signal that output clock signal controller 20 is to use to generate toggle high/low signals. Output clock signal generator 22 uses toggle high/low signals to generate an output clock signal. Toggle high signals cause the output clock signal to change from digital low to digital high whereas toggle low signals cause the output clock signal to change from digital high to digital low. The output clock signal is provided to clock tree 24 using a lead and clock tree 24 replicates the clock signal for distribution to other devices such as a central processing unit, random access memory, peripherals, timers, a Universal Asynchronous Receiver/Transmitter (UART) controller, and a general purpose input/output device. As used herein, a "lead" refers to a signal transmitting path such as but not limited to an electrically conductive path.

Figure 2:
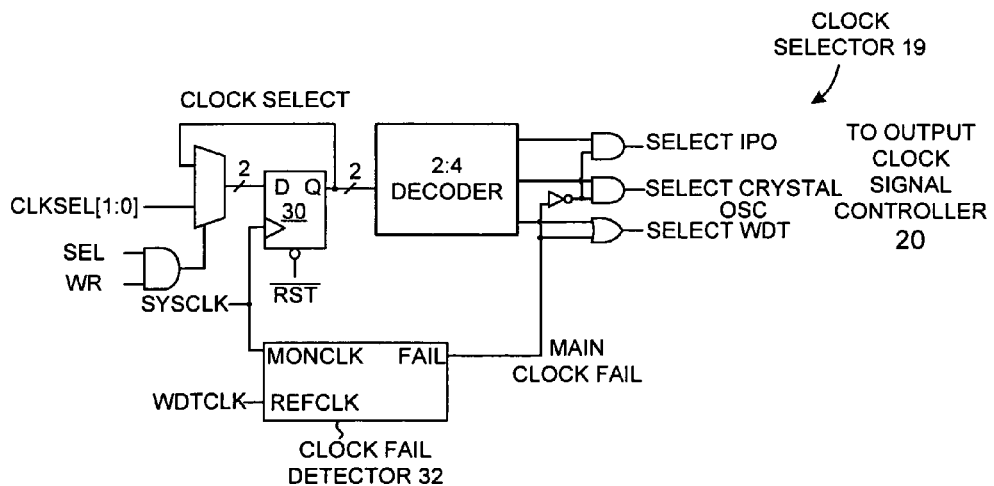
FIG. 2 is a simplified circuit diagram of a clock selector in accordance with one novel aspect.

FIG. 2 is a simplified circuit diagram of a clock selector 19 in accordance with one novel aspect. A processor (not shown) selects an input clock signal to use to generate an output clock signal by writing to an address of two-bit register 30. Two corresponding data bits on the processor data bus are written into the two-bit register 30. The two bits are represented in FIG. 2 as the two-bit value CLKSEL[1:0]. When the write occurs to the address of register 30, the signal WR is asserted as a high pulse. The two-bit value of CLKSEL[1:0] is clocked into register 30 on the next rising edge of the clock signal SYSCLK during the time WR is at a high level. The 2:4 decoder converts the two-bit value into digital high level of a clock select signal. For example, a two-bit value of zero (00) corresponds to a digital high level of a clock select signal (SEL0) for a clock signal from WDT 8 whereas a two-bit value of one (01) corresponds to a digital high level of a clock select signal (SEL1) for a clock signal from IPO 9.

Clock fail detector 32 determines whether the system clock SYSCLK is operating by counting clock cycles of the system clock. In this example, the system clock SYSCLK can be the clock signal from either of IPO 9 or terminal 10. If a clock failure is detected, clock selector 19 de-selects the clock signals from IPO 9 and terminal 10 even though the processor selects such clock signals and instead clock selector 19 selects the clock signal from WDT 8.

Figure 3:
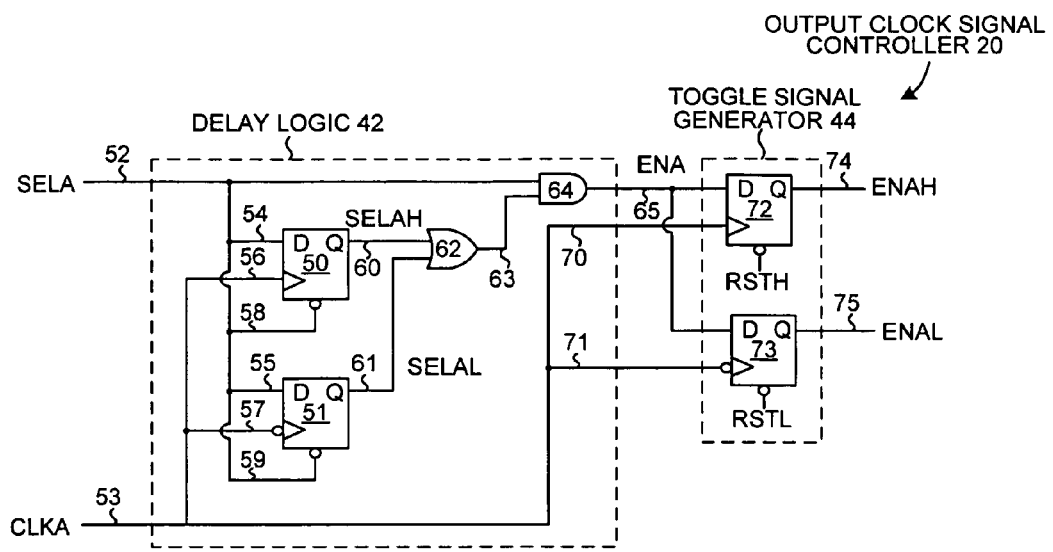
FIG. 3 is a simplified circuit diagram of an output clock signal controller for a single input clock signal in accordance with one novel aspect.

FIG. 3 is a simplified circuit diagram of an output clock signal controller 20 for a single input clock signal in accordance with one novel aspect. A replica of this output clock signal controller 20 is used for each input clock signal. For example, a separate output clock signal controller 20 is used to receive input clock signals from each of clock sources WDT 8, IPO 9, and terminal 10. Output clock signal controller 20 includes delay logic 42 and toggle signal generator 44. In the example described herein, the clock signals from clock sources WDT 8, IPO 9, and terminal 10 are assigned respective identifier values of zero (0), one (1), and two (2).

Delay logic 42 receives a clock select signal (shown as SELA) from lead 52 and an input clock signal from lead 53 (shown as CLKA). Clock select signal SELA is provided as an input to D flip-flop 50 using lead 54 and as an input to D flip-flop 51 using lead 55. Clock select signal SELA can also be provided as an input to the asynchronous clear input of D flip-flop 50 using lead 58 and can be provided as an input to the asynchronous clear input of D flip-flop 51 using lead 59. Clock signal CLKA is provided as the clock signal input to D flip flop 50 using lead 56 and an input to D flip-flop 51 using lead 57. An inverter to the clock input of D flip-flop 51 inverts clock signal CLKA from lead 57.

D flip-flop 50 is a positive edge-triggered flip-flop so that D flip-flop 50 transfers the input signal at input D to output Q on a rising edge of clock signal CLKA. D flip-flop 51 is a negative edge-triggered flip-flop so that D flip-flop 51 transfers the input signal at input D to output Q on a falling edge of clock signal CLKA. Output from terminal Q of flip-flop 50 is provided as signal SELAH using lead 60 to OR gate 62. Similarly, output from terminal Q of flip-flop 51 is provided as signal SELAL using lead 61 as another input to OR gate 62. OR gate 62 performs a logical OR operation and provides its output to lead 63. AND gate 64 performs a logical AND operation between clock select signal SELA and the signal on lead 63 from OR gate 62. The output from AND gate 64 is provided as clock enable signal ENA. AND gate 64 delays the output of a digital high level of clock select signal SELA until OR gate 62 provides a digital high level signal to AND gate 64 on lead 63. Clock enable signal ENA indicates an input clock signal A is to be output.

Figure 4:
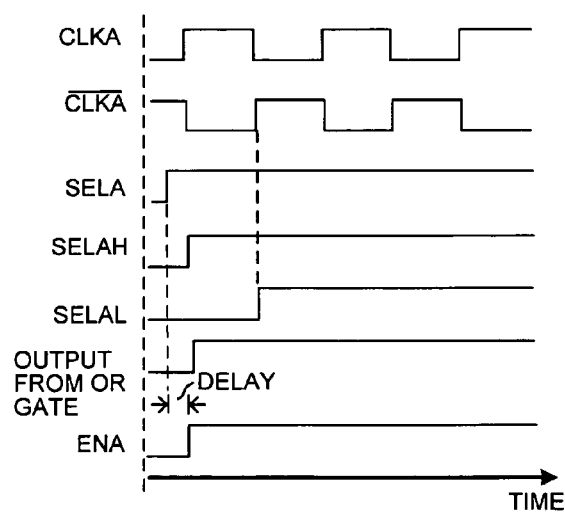
FIG. 4 is a simplified waveform diagram that illustrates an operation of delay logic of FIG. 3 in accordance with one novel aspect.

FIG. 4 is a simplified waveform diagram that illustrates an operation of delay logic 42 of FIG. 3 where the clock select signal SELA is delayed in its output in the form of clock enable signal ENA. D. flip-flop 50 transfers clock select signal SELA on the rising edge of input clock signal CLKA as signal SELAH. As shown, there is a delay between the digital high level of clock select signal SELA until the digital high level is transferred in the form of signal SELAH. After clock select signal SELA, transitions to the digital high level, D flip-flop 51 transfers the digital high level of clock select signal SELA on the next rising edge of an inverted version of clock signal CLKA as signal SELAL, which amounts to a one half period delay between the digital high level of signal SELAH and the output of the digital high level of signal SELAL. A logical OR of the signals SELAH and SELAL leads to the output of the OR gate 62 being digital high level at the earlier digital high level between signals SELAH and SELAL (shown as OUTPUT FROM OR GATE). A logical AND of clock select signal SELA and the output from the OR gate 62 yields clock enable signal ENA. Accordingly, a delay is introduced by delay logic 42 between the digital high level of a clock select signal SELA and the digital high level of clock enable signal ENA.

Figure 5:
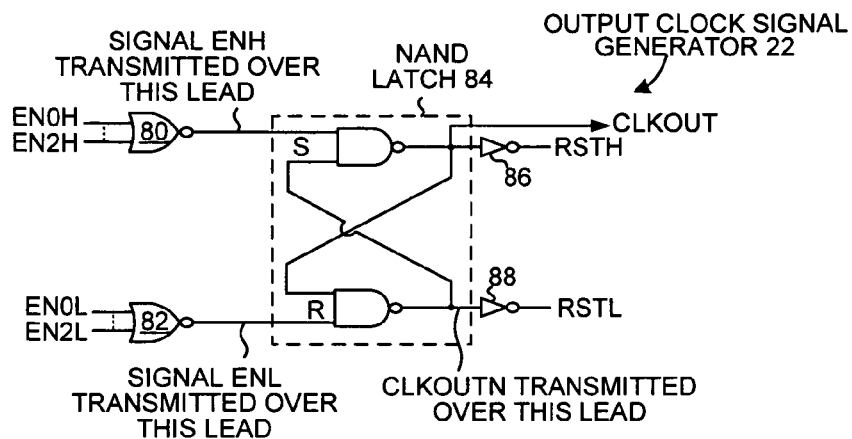
FIG. 5 is a simplified circuit diagram of an output clock signal generator in accordance with one novel aspect.

Referring again to FIG. 3, toggle signal generator 44 of output clock signal controller 20 includes D flip-flops 72 and 73 that each receive clock enable signal ENA at D inputs using lead 65. D flip-flop 72 receives clock signal CLKA at a clock input using lead 70. D flip-flop 73 receives clock signal CLKA at a clock input using lead 71 and inverts the clock signal. D flip-flop 72 receives asynchronous reset signal RSTH whereas D flip-flop 73 receives asynchronous reset signal RSTL. Asynchronous reset signals RSTH and RSTL are provided by output clock signal generator 22 (FIG. 5). D flip-flop 72 outputs toggle high signal ENAH on lead 74 whereas D flip-flop 73 outputs toggle low signal ENAL on lead 75. Toggle high signal ENAH causes output clock signal to toggle from digital low to digital high whereas toggle low signal ENAL causes output clock signal to toggle from digital high to digital low. A falling edge of reset high signal RSTH causes toggle high signal ENAH to toggle from digital high to digital low, and a falling edge of reset low signal RSTL causes toggle low signal ENAL to toggle from digital high to digital low. An operation of toggle signal generator 44 is described in connection with the waveform diagram of FIG. 6.

Delay logic 42 and toggle signal generator 44 together introduce a delay of at least one half clock period of a next selected clock signal between receiving a digital high level of signal SELA and outputting a toggle signal. Such a delay prevents glitches that are less than one half clock cycle of the next clock cycle in duration. Glitches that are too short in duration can cause elements that use the output clock signal to malfunction. A glitch that is more than one half clock cycle of the next clock cycle in duration may not cause any malfunction.

FIG. 5 is a simplified circuit diagram of an output clock signal generator in accordance with one novel aspect. In this example, output clock signal generator includes a first NOR gate 80 to receive and provide a result of a logical NOR operation based on toggle high signals from toggle signal generators associated with each input clock signal (e.g., EN0H to EN2H) as well as a second NOR gate 82 to receive and provide a result of a logical NOR operation based on toggle low signals from toggle signal generators associated with each input clock signal (e.g., EN0L to EN2L). For example, toggle high signals EN0H to EN2H can be generated by toggle signal generators associated with clock signals respectively from WDT 8, IPO 9, terminal 10 whereas toggle low signals EN0L to EN2L can be generated by toggle signal generators associated with clock signals respectively from WDT 8, IPO 9, terminal 10. The logical output from the first NOR gate 80 is an inverse toggle high signal ENH and the logical output from the second NOR gate 82 is an inverse toggle low signal ENL and the outputs are provided as inputs to a NAND latch 84. The NAND latch 84 receives signals ENH and ENL from respective first and second NOR gates 80 and 82. NAND latch 84 outputs output clock signal (CLKOUT) and the inverse of the output clock signal (CLKOUTN). NAND latch 84 holds the state of its output until a change is requested via a toggle signal. Inverter 86 inverts output clock signal CLKOUT whereas inverter 88 inverts the inverse of output clock signal CLKOUTN. Inverters 86 and 88 provides output signals as respective reset high signal RSTH and reset low signal RSTL.

In the event the current input clock signal fails or is unavailable, the NAND latch 84 holds the state of the output clock signal steady. When a next input clock signal is selected as the input clock signal, toggle signals based on the next clock signal are provided to NAND latch 84 and cause the state of the output clock signal to toggle and track the next input clock signal. Accordingly, use of a next clock signal can take place even though a current clock signal has failed or is unavailable.

Figure 6:
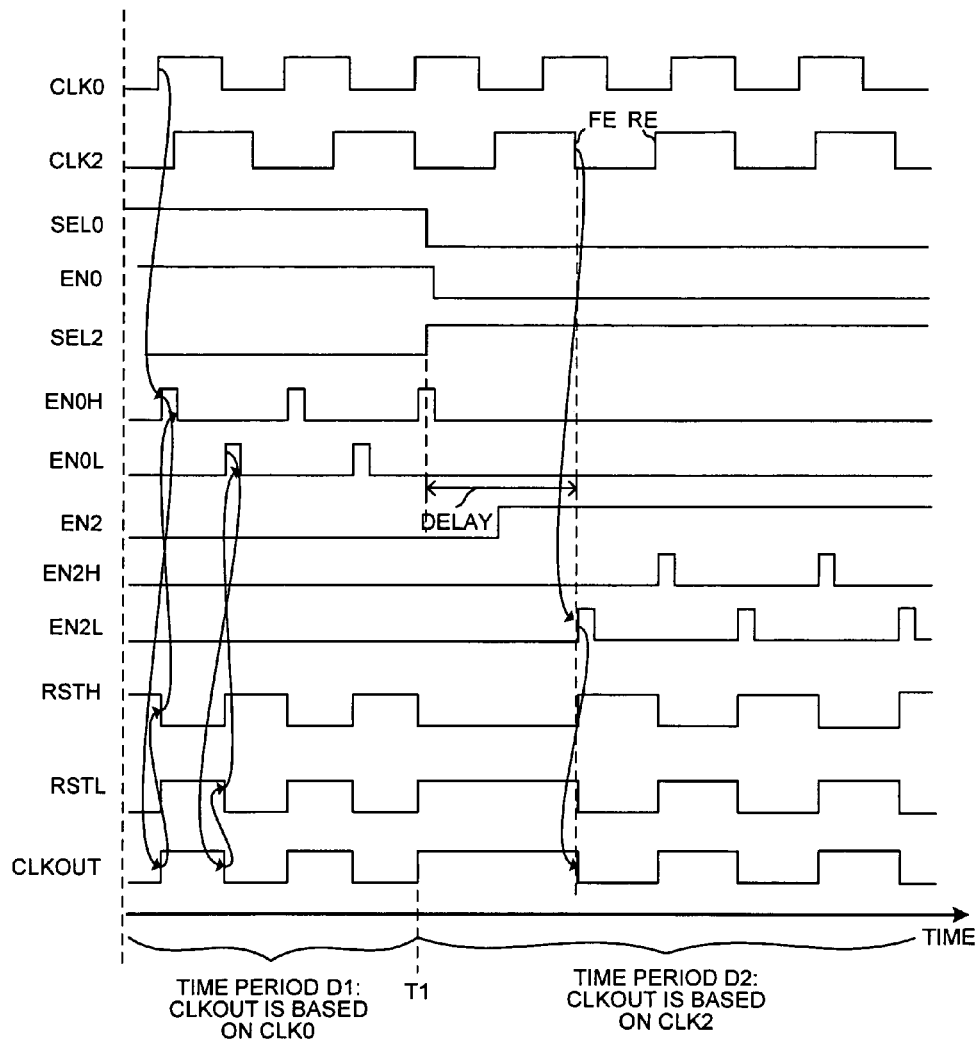
FIG. 6 is a simplified waveform diagram that illustrates generation of output clock signal CLKOUT when switching from use of input clock signal CLK0 to use of clock signal CLK2 in accordance with a novel aspect.

An example operation of a combination of output clock signal controller 20 (FIG. 3) and output clock signal generator 22 (FIG. 5) is described in connection with the simplified waveform diagram of FIG. 6. FIG. 6 is a simplified waveform diagram that illustrates generation of output clock signal CLKOUT when switching from use of input clock signal CLK0 to use of clock signal CLK2 in accordance with a novel aspect. During time period D1, clock signal CLK0 is selected for use as indicated by clock enable signal EN0 being asserted high. Signals EN0, EN0H, and EN0L are generated by an output clock signal controller for CLK0. For example, the output clock signal controller for CLK0 is depicted in FIG. 3.

The following describes operation to cause transition of output clock signal CLKOUT from digital low level to digital high level while CLK0 is the current input clock signal. EN0 is a digital high level to enable use of clock signal CLK0. A rising edge of clock signal CLK0 causes toggle high signal EN0H from D flip-flop 72 to transition to a digital high level. A digital high level of toggle high signal EN0H causes NAND latch 84 to modify output clock signal CLKOUT to transition from digital low to digital high (see NAND latch 84 of FIG. 5). Because output clock signal CLKOUT is inverted by inverter 86 of FIG. 5 to provide asynchronous reset signal RSTH, a digital high level of clock signal CLKOUT causes asynchronous reset signal RSTH to change from digital high to digital low level. Application of a digital low level of asynchronous reset signal RSTH resets toggle high signal EN0H to a digital low level because reset signal RSTH is an asynchronous reset input to D flip-flop 72 (FIG. 3). NAND latch 84 of FIG. 5 holds the state of the output clock signal to digital high level until it receives a toggle low signal. The toggle low signal can be generated based on a current or next input clock signal.

The following describes operation to cause transition of output clock signal CLKOUT from digital high level to a digital low level. EN0 is a digital high level to enable use of clock signal CLK0. Because D flip-flop 73 inverts its clock signal input, a falling edge of clock signal CLK0 causes D flip-flop 73 (FIG. 3) to change toggle low signal EN0L to a digital high level. A digital high level of toggle low signal EN0L causes NAND latch 84 (FIG. 5) to modify output clock signal CLKOUT to transition from digital high to digital low and inverted output clock signal CLKOUTN to transition from digital low to digital high level. Inverter 88 (FIG. 5) inverts inverted output clock signal CLKOUTN so that asynchronous reset signal RSTL transitions from digital high to digital low level. Application of a digital low level of asynchronous reset signal RSTL resets toggle high signal EN0L to a digital low level because reset signal RSTL is an asynchronous reset input to D flip-flop 73 (FIG. 3). NAND latch 84 of FIG. 5 holds the state of the output clock signal to digital low level until it receives a toggle high signal. The toggle high signal can be generated based on a current or next input clock signal.

At time T1, clock select signal SEL0 transitions from digital high level to digital low level and clock select signal SEL2 transitions to a digital high level thereby deselecting input clock signal CLK0 and selecting input clock signal CLK2 to be used to generate output clock signal CLKOUT. Latch 84 holds output clock signal CLKOUT at digital high level. If the clock signal CLK0 were to fail or become unavailable while selected as the current input clock, the next selected input clock CLK2 could be selected for use at least because selection of input clock signal CLK2 does not depend on operation of clock signal CLK0. For example, enabling clock signal CLK2 as the input clock signal does not occur using clock signal CLK0.

Signals EN2, EN2H, and EN2L are generated by an output clock signal controller for CLK2 shown in FIG. 3. Delay logic 42 (FIG. 3) delays the transfer of the digital high level of clock select signal SEL2 in the form of clock enable signal EN2 until a next rising edge of clock signal CLK2. Because D flip-flop 73 inverts its clock signal input, a falling edge of clock signal CLK2 (shown as FE) causes D flip-flop 73 (FIG. 3) to change toggle low signal EN2L to a digital high level. A delay between the digital high level of SEL2 and generation of a toggle signal EN2L is at least one half clock cycle of CLK2. The delay prevents glitches in the output clock signal that are less than one half clock period of clock signal CLK2. A digital high level of toggle low signal EN2L causes NAND latch 84 (FIG. 5) to modify output clock signal CLKOUT to transition from a digital high to a digital low and inverted output clock signal CLKOUTN to transition from a digital low to a digital high level. Thereafter, output clock signal CLKOUT toggles high to low and low to high in a similar manner as that described when clock signal CLK0 is used to generated clock signal CLKOUT except that EN2H and EN2L are used to cause respective toggle high and toggle low of output clock signal CLKOUT.

At time T1, were output clock signal CLKOUT to be a digital low level, then it would remain in a digital low level and change to digital high level in response to a toggle high signal EN2H generated in response to rising edge "RE" in FIG. 6.

Figure 7:
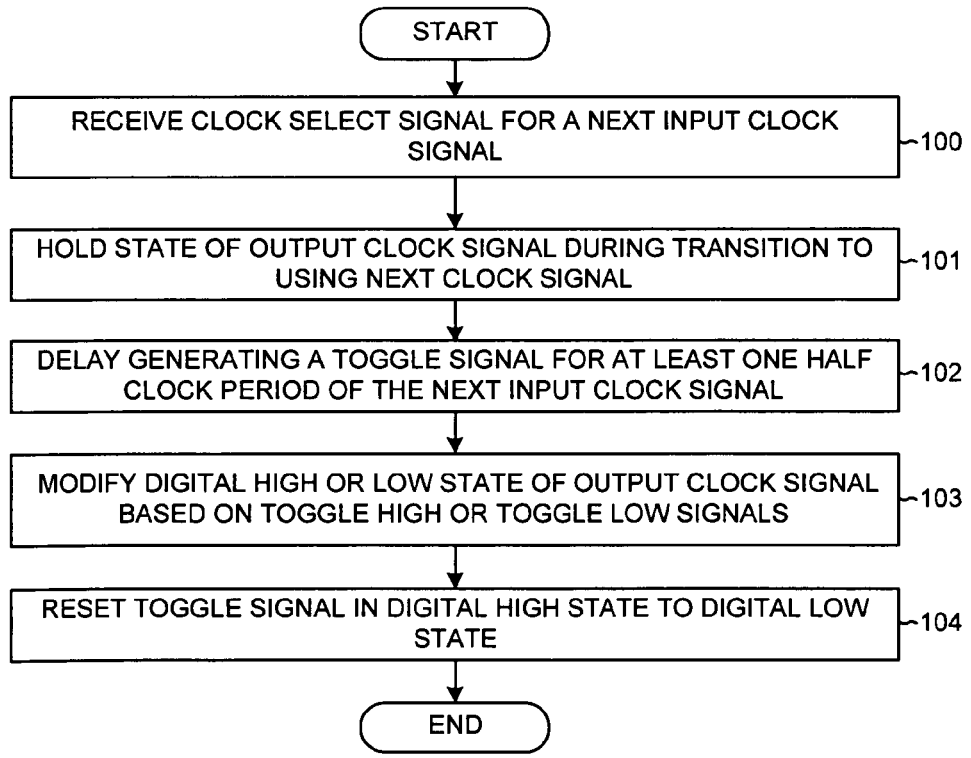
FIG. 7 is a simplified flowchart of an example of a method used to switch from one input clock signal to another input clock signal in accordance with a novel aspect.

FIG. 7 is a simplified flowchart of an example of a method used to switch from a current input clock signal to a next input clock signal in accordance with a novel aspect. In action 100, a clock select signal at a digital high level is received by an output clock signal controller to enable use of a next input clock signal to generate output clock signal CLKOUT. In the example of FIG. 3, the clock select signal SELA is provided to D flip-flops 50 and 51 and AND gate 64.

In action 101, the state of the output clock signal CLKOUT is held in its state during transition to use of a next input clock signal. When the next input clock signal is selected, the current input clock signal is deselected. Deselecting the current input clock signal disables generating any toggle signals by output clock signal controller (FIG. 3) based on the current input clock signal. NAND latch 84 of FIG. 5 holds the state of the output clock signal in its state until a toggle signal is received.

In action 102, generating a toggle signal in response to the clock select signal for the next input clock signal being digital high is delayed for at least one half clock period of the next input clock signal. D flip-flops 50 and 51, AND gate 64, and D flip-flops 72 and 73 together act to delay generating any toggle signal (ENAH and ENAL of FIG. 3) in response to the clock select signal for the next input clock signal being digital high for at least one half clock period of the next input clock signal. A toggle signal is provided to toggle an output clock signal to a high level or to a low level based on a rising or falling edge of the next clock signal. In the example of FIG. 3, a rising edge of input clock signal CLKA causes D flip-flop 72 to transfer a toggle high signal ENAH with a digital high level whereas a falling edge of input clock signal CLKA causes D flip-flop 73 to transfer a toggle low signal ENAL with a digital high level.

In action 103, the digital level of the output clock signal CLKOUT is modified based on the toggle high or toggle low signals. A toggle high signal causes the output clock signal to switch to digital high level whereas a toggle low signal causes the output clock signal to switch to digital low level. In the example of FIG. 5, NOR gates 80 and 82 provide inputs to NAND latch 84 of respective toggle high and toggle low signals. The NAND latch 84 toggles the output clock signal based on the toggle signals.

In action 104, the toggle signal in the digital high level is reset to digital low. In the example of FIGS. 3 and 5, the asynchronous reset signal RSTH causes the toggle high signal ENAH to go to digital low by asserting a reset to D flip-flop 72 whereas the asynchronous reset signal RSTL causes the toggle low signal ENAL to digital low by asserting a reset to D flip-flop 73.

The Compact Disc appendix contains Verilog format source code of another embodiment of the present invention. For example, the file OscCtl.v is an implementation of an embodiment of the clock multiplexer circuit 1 of FIG. 1 and an implementation of an embodiment of the clock selector 19 of FIG. 2. The file OscFailDet.v is an implementation of an embodiment of clock fail detector 32 of FIG. 2. The file ClkMux.v is an implementation of an embodiment of the output clock signal controller 20 of FIG. 3 and the output clock signal generator 22 of FIG. 5.

Although certain specific embodiments are described above for instructional purposes, the teachings of this patent document have general applicability and are not limited to the specific embodiments described above. In FIG. 2, any clock signal can be selected as the system clock and not just the clock signal from either of IPO 9 or terminal 10. For example, an additional clock source can be provided to be used as the system clock. In FIG. 3, the AND gate 64 can be removed and instead the output from OR gate 62 is provided to lead 65. In FIG. 3, logic can be added to disable output of any toggle signal as soon as another input clock signal is selected for use. In FIG. 3, instead of using flip flops 50 and 51, a single flip flop could be used and the clock select signal SELA would be transferred on the next positive edge of clock signal CLKA. This implementation would simplify the logic but it would take a little longer to startup output clock signal controller 20. In FIG. 3, as yet another alternative, transfer of the clock select signal SELA could be delayed even further when switching clocks by using two flip-flops in series so that at least two full clock cycles instead of just one half clock cycle occurring prior to the clock select signal SELA being transferred as clock enable signal ENA. Accordingly, glitches that are less than two clock cycles of the second clock signal in duration can be avoided. In FIG. 5, the NOR gates 80 and 82 can be replaced with OR gates that provide inputs to a NOR latch or a latch instead of a NAND latch 84. Instead of using the Q outputs of flip-flops 72 and 73, inverted Q bar outputs (not shown) could be input to an AND or NAND gate instead of the NOR gates 80 and 82. If AND gates are used in place of NOR gates 80 and 82, then a NAND latch is used which has active low inputs. If a NAND gate is used in place of NOR gates 80 and 82, then a NOR latch is used in place of NAND latch 84 which has active high inputs.

Embodiments of the present invention may be implemented as any of or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). Accordingly, various modifications, adaptations, and combinations of various features of the described embodiments can be practiced without departing from the scope of the invention as set forth in the claims.

What is claimed is:

1. An apparatus comprising:
an output clock signal controller that generates toggle signals in response to rising or falling edges of a selected next input clock signal, wherein the selected next input clock signal is selected from a plurality of input clock signals, wherein the toggle signals include a toggle high signal triggered by a rising edge of the selected next input clock signal and wherein the toggle signals further include a toggle low signal triggered by a falling edge of the selected next input clock signal; and
an output clock signal generator that generates an output clock signal in response to the toggle signals, wherein the output clock signal generator changes the output clock signal to a digital high level in response to receipt of the toggle high signal and wherein the output clock signal generator changes the output clock signal to a digital low level in response to receipt of the toggle low signal.

2. The apparatus of claim 1, wherein the output clock signal controller delays generating any toggle signal in response to selection of the next input clock signal until elapse of at least one half period of the next input clock signal.

3. The apparatus of claim 1, wherein the output clock signal controller receives a signal identifying the selected next input clock signal.

4. An apparatus comprising:
- an output clock signal controller that generates toggle signals in response to rising or falling edges of a selected next input clock signal, wherein the selected next input clock signal is selected from a plurality of input clock signals, wherein the toggle signals include a toggle high signal triggered by a rising edge of the selected next input clock signal and wherein the toggle signals further include a toggle low signal triggered by a falling edge of the selected next input clock signal; and
- an output clock signal generator that generates an output clock signal in response to the toggle signals, wherein the output clock signal generator changes the output clock signal to a digital high level in response to receipt of the toggle high signal and wherein the output clock signal generator changes the output clock signal to a digital low level in response to receipt of the toggle low signal, and wherein the output clock signal generator generates a reset signal that resets a toggle signal.

5. The apparatus of claim 4, wherein the output clock signal generator receives toggle signals generated by a plurality of output clock signal controllers.

6. The apparatus of claim 4, wherein the toggle signals are reset before a change of logic level in the identified next input clock signal.

7. The apparatus of claim 4, wherein the output clock signal controller receives a reset signal that resets a toggle signal.

8. The apparatus of claim 4, wherein the output clock signal controller comprises:
- a delay logic that receives a signal identifying the selected next input clock signal and that delays the signal.

9. The apparatus of claim 4, further comprising:
- a clock fail detector that de-selects a failed clock signal.

10. An apparatus comprising:
- a toggle signal generator that generates toggle signals in response to a selected next input clock signal, wherein the toggle signals include a clock enable high signal triggered by a rising edge of the selected next input clock signal and wherein the toggle signals further include a clock enable low signal triggered by a falling edge of the selected input clock signal; and
- an output clock signal generator that generates an output clock signal in response to the toggle signals, wherein the output clock signal generator changes the output clock signal to a digital high level in response to receipt of the clock enable high signal and wherein the output clock signal generator changes the output clock signal to a digital low level in response to receipt of the clock enable low signal.

11. The apparatus of claim 10, wherein generating of any toggle signal in response to selection of the next input clock signal is delayed until elapse of at least one half period of the next input clock signal.

12. The apparatus of claim 10, wherein the toggle signal generator receives a signal identifying the selected next input clock signal.

13. The apparatus of claim 10, wherein the output clock signal generator receives toggle signals generated by a plurality of toggle signal generators.

14. The apparatus of claim 10, wherein the toggle signals are reset before a change of logic level in the identified next input clock signal.

15. An apparatus comprising:
- an output clock signal controller that generates toggle signals in response to rising or falling edges of a selected next input clock signal, wherein the toggle signals include a toggle high signal triggered by a rising edge of the selected next input clock signal, wherein the toggle signals further include a toggle low signal triggered by a falling edge of the selected next input clock signal, and wherein the output clock signal controller comprises:
  - a delay logic that receives a signal identifying the selected next input clock signal and that delays the signal; and
  - a toggle signal generator that delays generating any toggle signal in response to receipt of the signal identifying the selected next clock input signal until elapse of at least one half period of the selected next input clock signal; and
- an output clock signal generator that generates an output clock signal in response to the toggle signals, wherein the output clock signal generator changes the output clock signal to a digital high level in response to receipt of the toggle high signal and wherein the output clock signal generator changes the output clock signal to a digital low level in response to receipt of the toggle low signal.

16. An apparatus comprising:
- an output clock signal controller that generates toggle signals in response to rising or falling edges of a selected next input clock signal, wherein the toggle signals include a toggle high signal triggered by a rising edge of the selected next input clock signal, and wherein the toggle signals further include a toggle low signal triggered by a falling edge of the selected next input clock signal; and
- an output clock signal generator that generates an output clock signal in response to the toggle signals, wherein the output clock signal generator changes the output clock signal to a digital high level in response to receipt of the toggle high signal, wherein the output clock signal generator changes the output clock signal to a digital low level in response to receipt of the toggle low signal, wherein the output clock signal generator comprises a latch, and wherein the latch holds a state of the output clock signal at a current state until changed by the toggle signals.

17. A method comprising:
- receiving a clock select signal that identifies an input clock signal to use to generate an output clock signal;
- delaying generating a toggle signal based on a rising or falling edge of the identified input clock signal in response to receipt of the clock select signal; and
- generating the output clock signal based on the toggle signal, wherein the toggle signal controls whether the output clock signal transitions to a digital high level or a digital low level, and wherein the generating the output clock signal comprises using a latch that changes state of its output in response to the toggle signal, wherein the latch holds a state of the output clock until the toggle signal is received.

18. An apparatus comprising:

a first clock signal source that outputs a first clock signal;

a second clock signal source that outputs a second clock signal; and means for switching between use of the first clock signal and use of the second clock signal thereby generating an output clock signal, wherein the means generates the output clock signal in response to edges of the first clock signal or the second clock signal, wherein the means comprises a latch that provides the output clock signal and stores a state of the output clock signal, and wherein the latch changes logic level of the output clock signal in response to toggle signals.

19. The apparatus of claim 18, wherein one of the toggle signals causes the output clock signal to change to a digital high level in response to a rising edge of the identified input clock signal.

20. The apparatus of claim 18, wherein one of the toggle signals causes the output clock signal to change to a digital low level in response to a falling edge of the identified input clock signal.

* * * * *